(12) United States Patent
Kubota et al.

(10) Patent No.: US 7,459,495 B2
(45) Date of Patent: Dec. 2, 2008

(54) ACRYLIC RUBBER COMPOSITION AND CROSSLINKED OBJECT

(75) Inventors: Isao Kubota, Tokyo (JP); Kiyonori Umetsu, Tokyo (JP); Yoshiaki Aimura, Tokyo (JP)

(73) Assignee: Zeon Corporation, Tokyo (JP)

( * ) Notice: Subject to any disclaimer, the term of this patent is extended or adjusted under 35 U.S.C. 154(b) by 296 days.

(21) Appl. No.: 10/530,877

(22) PCT Filed: Oct. 8, 2003

(86) PCT No.: PCT/JP03/12893

§ 371 (c)(1),
(2), (4) Date: Apr. 11, 2005

(87) PCT Pub. No.: WO2004/033552

PCT Pub. Date: Apr. 22, 2004

(65) Prior Publication Data

US 2006/0167159 A1    Jul. 27, 2006

(30) Foreign Application Priority Data

Oct. 9, 2002    (JP) ............................. 2002-295819
Nov. 20, 2002   (JP) ............................. 2002-335984

(51) Int. Cl.
*C08K 3/08*    (2006.01)
(52) U.S. Cl. ...................... 524/439; 524/556; 524/493; 525/288
(58) Field of Classification Search ................ 524/439, 524/556, 493; 525/288
See application file for complete search history.

(56) References Cited

U.S. PATENT DOCUMENTS 3,575,785 A * 4/1971 McManimie et al. ........ 428/331
5,965,640 A * 10/1999 Kobayashi et al. ............ 524/81
6,815,506 B2 * 11/2004 Takashima et al. .......... 525/221

FOREIGN PATENT DOCUMENTS

| JP | 3-229747 A   |   | 10/1991 |
| JP | 4-126738 A   |   | 4/1992  |
| JP | 04126738 A   | * | 4/1992  |
| JP | 4-198249 A   |   | 7/1992  |
| JP | 8-109302 A   |   | 4/1996  |
| JP | 10-53684 A   |   | 2/1998  |
| JP | 10-87943 A   |   | 4/1998  |
| JP | 10-231386 A  |   | 9/1998  |
| JP | 11-158331 A  |   | 6/1999  |
| JP | 11-279365 A  |   | 10/1999 |
| JP | 2001-316554 A|   | 11/2001 |

* cited by examiner

*Primary Examiner*—Randy Gulakowski
*Assistant Examiner*—Michael M Bernshteyn
(74) *Attorney, Agent, or Firm*—Birch, Stewart, Kolasch & Birch, LLP

(57) ABSTRACT

An acrylic rubber composition comprising (A) 100 weight parts of an acrylic rubber comprising 80-99.9 weight % of units of a monomer selected from acrylic acid ester monomers and methacrylic acid ester monomers, and 0.1-20 weight % of units of an α,β-ethylenically unsaturated carboxylic acid monomer, (B) 5-200 weight parts of synthetic silica, and (C) 0.05-20 weight parts of a crosslinking agent. The acrylic rubber composition preferably further comprises 5-200 weight parts of aluminum silicate containing at least 5 weight % of $Al_2O_3$ wherein the total amount of $Al_2O_3$ and $SiO_2$ is at least 60 weight %. The rubber composition has good storage stability and gives a crosslinked object having good heat aging resistance, reduced compression set and good mechanical properties.

14 Claims, No Drawings

ACRYLIC RUBBER COMPOSITION AND CROSSLINKED OBJECT

TECHNICAL FIELD

This invention relates to an acrylic rubber composition and a crosslinked object. More particularly it relates to an acrylic rubber composition giving a crosslinked object having good storage stability, good mechanical properties, high heat resistance and reduced compression set.

BACKGROUND ART

An acrylic rubber has high heat resistance and good oil resistance, and therefore is widely used in automobile and related fields. However, in fields of sealing material, hose material, vibration insulating material, tube material, belt material and boot material, more enhanced heat aging resistance and reduced compression set are recently eagerly desired. Further, an acrylic rubber has a problem in storage stability, namely in the fact that the viscosity of an uncrosslinked acrylic rubber composition undesirably increases during storage and the processability thereof is reduced.

In view of the above-mentioned beneficial properties, an acrylic rubber is widely used as a colored material. In the field of a colored material, a white filler such as synthetic silica, i.e., white carbon, is usually incorporated in a rubber composition. However, a white filler particle has a small specific surface area and a poor interaction with a rubber polymer, and thus, an acrylic rubber composition having a white filler incorporated therein has poor mechanical properties. Therefore, a crosslinked object of a white filler-incorporated acrylic rubber having improved mechanical properties is also desired.

To provide a crosslinked rubber of white filler-incorporated acrylic rubber having improved mechanical strength, incorporation of silica having a pH value in the range of 6.5 to 8.5 and a specific surface area of at least about 150 m²/g has been proposed (Japanese Unexamined Patent Publication H8-109302). However, the crosslinked object of the silica-incorporated acrylic rubber composition tends to have a rather large compression set.

To provide a white filler-incorporated acrylic rubber composition having enhanced storage durability and giving a crosslinked rubber having good mechanical properties, there has been proposed an acrylic rubber composition comprising a halogen-containing acrylic rubber, a triazine thiol crosslinking agent, a dithiocarbamic acid derivative, hydrotalcite, an aromatic carboxylic acid, a white filler having a pH value in the range of 2 to 10 and a silane coupling agent (Japanese Unexamined Patent Publication H10-53684). However, the storage stability of the acrylic rubber composition is not improved to the desired extent and the compression set of the crosslinked rubber is not sufficiently reduced.

DISCLOSURE OF THE INVENTION

An object of the present invention is to provide an acrylic rubber composition giving a crosslinked rubber object having good storage stability, good mechanical properties, high heat resistance and sufficiently reduced compression set.

To achieve the above-mentioned object, the present inventors made extensive research and found that an acrylic rubber composition containing a carboxyl group as a crosslinking site and having synthetic silica incorporated therein can attain the above-mentioned object. The present invention has been completed based on this finding.

Thus, in accordance with the present invention, there is provided an acrylic rubber composition comprising:
(A) 100 parts by weight of an acrylic rubber comprising 80 to 99.9% by weight of units of at least one kind of monomer selected from the group consisting of acrylic acid ester monomers and methacrylic acid ester monomers, and 0.1 to 20% by weight of units of an α,β-ethylenically unsaturated carboxylic acid monomer,
(B) 5 to 200 parts by weight of synthetic silica, and
(C) 0.05 to 20 parts by weight of a crosslinking agent.

As one preferable embodiment, there is provided an acrylic rubber composition comprising the above ingredients (A), (B) and (C) and further comprising 5 to 200 parts by weight of aluminum silicate containing at least 5% by weight of $Al_2O_3$ wherein the total amount of $Al_2O_3$ and $SiO_2$ is at least 60% by weight based on the aluminum silicate.

As still another preferable embodiment, there is provided an acrylic rubber composition comprising the above ingredients (A), (B) and (C) wherein the synthetic silica is a calcined silica product prepared by heating wet-process silica.

As a further preferable embodiment, there is provided a crosslinked object made by crosslinking the above-mentioned acrylic rubber composition.

BEST MODE FOR CARRYING OUT THE INVENTION

The acrylic rubber used in the present invention comprises 80 to 99.9% by weight of units of at least one kind of monomer selected from the group consisting of acrylic acid ester monomers and methacrylic acid ester monomers (acrylic acid ester monomers and methacrylic acid monomers are hereinafter referred to collectively as "(meth)acrylic acid ester monomers" when appropriate), and 0.1 to 20% by weight of units of an α,β-ethylenically unsaturated carboxylic acid monomer.

The (meth)acrylic acid ester monomers for the main ingredient units of the acrylic rubber include alkyl esters of (meth)acrylic acid and alkoxyalkyl esters of (meth)acrylic acid.

The alkyl esters of (meth)acrylic acid preferably include esters of (meth)acrylic acid with an alkanol having 1 to 8 carbon atoms, and, as specific examples thereof, there can be mentioned methyl acrylate, ethyl acrylate, n-propyl acrylate, n-butyl acrylate, isopropyl acrylate, isobutyl acrylate, n-hexyl acrylate, 2-ethylhexyl acrylate, cyclohexyl acrylate, methyl methacrylate, ethyl methacrylate, n-propyl methacrylate, n-butyl methacrylate, isopropyl methacrylate, isobutyl methacrylate, n-hexyl methacryalte, 2-ethylhexyl methacrylate and cyclohexyl methacrylate. Of these, ethyl acrylate, n-butyl acrylate, ethyl methacrylate and n-butyl methacrylate are preferable.

The alkoxyalkyl esters of (meth)acrylic acid preferably include esters of (meth) acrylic acid with an alkoxyalkyl alcohol having 2 to 8 carbon atoms, and, as specific examples thereof, there can be mentioned methoxymethyl acrylate, ethoxymethyl acrylate, 2-ethoxyethyl acrylate, 2-butoxyethyl acrylate, 2-methoxyethyl acrylate, 2-propoxyethyl acrylate, 3-methoxypropyl acrylate, 3-methoxybutyl acrylate, methoxymethyl methacrylate, ethoxymethyl methacrylate, 2-ethoxyethyl methacrylate, 2-butoxyethyl methacrylate, 2-methoxyethyl methacrylate, 2-propoxyethyl methacrylate, 3-methoxypropyl methacrylate and 3-methoxybutyl methacrylate. Of these, 2-ethoxyethyl acryalte, 2-methoxyethyl acrylate, 2-ethoxyethyl methacryalte and 2-methoxyethyl methacrylate are preferable. 2-Ethoxyethyl acrylate and 2-methoxyethyl acrylate are especially preferable.

The amount of units of (meth)acrylic acid ester monomers in the acrylic rubber is in the range of 80 to 99.9% by weight, preferably 90 to 99.8% by weight, and more preferably 95 to 99.5% by weight. If the amount of units of (meth)actylic acid ester monomers is too small, the crosslinked rubber object is liable to have poor weather resistance, poor heat resistance and poor oil resistance.

The units of (meth)acrylic acid ester monomers preferably comprise 30 to 100% by weight of units of at least one kind of a monomer selected from the group consisting of alkyl acrylate monomers and alkyl methacrylate monomers, and 0 to 70% by weight of units of at least one kind of a monomer selected from the group consisting of alkoxyalkyl acrylate monomers and alkoxyalkyl methacrylate monomers.

The acrylic rubber used in the present invention comprises units of α,β-ethylenically unsaturated carboxylic acid monomer in addition to the units of (meth)acrylic acid ester monomers.

The carboxyl group or groups in the units of α,β-ethylenically unsaturated carboxylic acid monomer forms a crosslinking site when the acrylic rubber composition of the present invention is crosslinked. The α,β-ethylenically unsaturated carboxylic acid monomer forming the units having crosslinking sites by polymerization reaction includes α,β-ethylenically unsaturated monocarboxylic acids, α,β-ethylenically unsaturated dicarboxylic acids and monoesters of α,β-ethylenically unsaturated carboxylic acids with an alkanol.

The α,β-ethylenically unsaturated monocarboxylic acid usually includes those which have 3 to 12 carbon atoms, and, as specific examples thereof, there can be mentioned acrylic acid, methacrylic acid, ethylacrylic acid, crotonic acid and cinnamic acid.

The α,β-ethylenically unsaturated dicarboxylic acid usually includes those which have 4 to 12 carbon atoms, and, as specific examples thereof, there can be mentioned butenedioic acid such as fumaric acid or maleic acid, itaconic acid, citraconic acid and chloromaleic acid.

The monoester of an α,β-ethylenically unsaturated carboxylic acid with an alkanol usually includes monoesters of an α,β-ethylenically unsaturated carboxylic acid having 3 to 11 carbon atoms with an alkanol having 1 to 8 carbon atoms, and, as specific examples thereof, there can be mentioned butenedioic acid mono-chain like alkyl esters such as monomethyl fumarate, monoethyl fumarate, monobutyl fumarate, monomethyl maleate, monoethyl maleate and monobutyl maleate; butenedioic acid monoesters having an alicyclic structure such as monocyclopentyl fumarate, monocyclohexyl fumarate, monocyclohexenyl fumarate, monocyclopentyl maleate, monocyclohexyl maleate and monocyclohexenyl maleate; itaconic acid monoesters such as monomethyl itaconate, monoethyl itaconate and monobutyl itaconate; and fumaric acid monoesters such as mono-2-hydroxyethyl fumarate. Of these, butenedioic acid mono-chain like alkyl esters and butenedioic acid monoesters having an alicyclic structure are preferable. Monobutyl fumarate, monobutyl maleate, monocyclohexyl fumarate and monocyclohexyl maleate are especially preferable. These monoesters may be used either alone or as a combination of at least two thereof.

Among the above-recited monomers, α,β-ethylenically unsaturated dicarboxylic acids may be copolymerized as anhydrides thereof. The anhydride units in an acrylic copolymer can be hydrolyzed to form carboxyl groups when the acrylic copolymer is crosslinked.

The amount of the units of α,β-ethylenically unsaturated carboxylic acid monomer in the acrylic rubber is in the range of 0.1 to 20% by weight, preferably 0.2 to 10% by weight and more preferably 0.5 to 5% by weight. If the amount of the units of α,β-ethylenically unsaturated carboxylic acid monomer is too small, a resulting crosslinked object has a low crosslink density and is liable to have poor mechanical properties and low surface smoothness. In contrast, if the amount of the units of α,β-ethylenically unsaturated carboxylic acid monomer is too large, a resulting crosslinked object is liable to have a small elongation and a rather large compression set.

If desired, a monomer having a crosslinking site other than a carboxyl group may be copolymerized. Such a monomer includes a monomer having a halogen atom, an epoxy group or a hydroxyl group; and a diene monomer.

The halogen atom-containing monomer is not particularly limited, and includes, for example, esters of a saturated halocarboxylic acid with an unsaturated alcohol, acrylic acid haloalkyl esters and methacrylic acid haloalkyl esters; acrylic acid haloacyloxyalkyl esters and methacrylic acid haloacyloxyalkyl esters; acrylic acid (haloacethylcarbamoyloxy) alkyl esters and methacrylic acid (haloacethylcarbamoyloxy) alkyl esters; halogen-containing unsaturated ethers, halogen-containing unsaturated ketones, haloalkyl group-containing aromatic vinyl compounds, haloalkyl group-containing unsaturated amides and haloacyl group-containing unsaturated monomers.

The esters of a saturated halocarboxylic acid with an unsaturated alcohol preferably include esters of a saturated halocarboxylic acid having 3 to 12 carbon atoms with an unsaturated alkanol having 2 to 6 carbon atoms, and, as specific examples thereof, there can be mentioned vinyl chloroacetate, vinyl 2-chloropropionate and allyl chloroacetate.

The acrylic acid haloalkyl esters preferably include those which have 4 to 12 carbon atoms, and, as specific examples thereof, there can be mentioned chloromethyl acrylate, 1-chloroethyl acrylate, 2-chloroethyl acrylate, 1,2-dichloroethyl acrylate, 2-chloropropyl acrylate, 3-chloropropyl acrylate and 2,3-dichloropropyl acrylate.

The methacrylic acid haloalkyl esters preferably include those which have 4 to 12 carbon atoms, and, as specific examples thereof, there can be mentioned chloromethyl methacrylate, 1-chloroethyl methacrylate, 2-chloroethyl methacrylate, 1,2-dichloroethyl methacrylate, 2-chloropropyl methacrylate, 3-chloropropyl methacrylate and 2,3-dichloropropyl methacrylate.

The acrylic acid haloacyloxyalkyl esters preferably include those which have 6 to 12 carbon atoms, and, as specific examples thereof, there can be mentioned 2-(chloroacetoxy) ethyl acrylate, 2-(chloroacetoxy)propyl acrylate, 3-(chloroacetoxy)propyl acrylate and 3-(hydroxychloroacetoxy)propyl acrylate.

The methacrylic acid haloacyloxyalkyl esters preferably include those which have 6 to 12 carbon atoms, and, as specific examples thereof, there can be mentioned 2-(chloroacetoxy)ethyl methacrylate, 2-(chloroacetoxy)propyl methacrylate, 3-(chloroacetoxy)propyl methacrylate and 3-(hydroxychloroacetoxy)propyl methacrylate.

The acrylic acid (haloacethylcarbamoyloxy)alkyl esters preferably include those which have 7 to 12 carbon atoms, and, as specific examples thereof, there can be mentioned 2-(chloroacetylcarbamoyloxy)ethyl acrylate and 3-(chloroacetylcarbamoyloxy)propyl acrylate.

The methacrylic acid (haloacethylcarbamoyloxy)alkyl esters preferably include those which have 7 to 12 carbon atoms, and, as specific examples thereof, there can be mentioned 2-(chloroacetylcarbamoyloxy)ethyl methacrylate and 3-(chloroacetylcarbamoyloxy)propyl methacrylate.

The halogen-containing unsaturated ethers preferably include those which have 3 to 12 carbon atoms, and, as specific examples thereof, there can be mentioned chloromethyl vinyl ether, 2-chloroethyl vinyl ether, 3-chloropropyl vinyl ether, 2-chloroethyl allyl ether and 3-chloropropyl allyl ether.

The halogen-containing unsaturated ketones preferably include those which have 4 to 12 carbon atoms, and, as specific examples thereof, there can be mentioned 2-chloroethyl vinyl ketone, 3-chloropropyl vinyl ketone and 2-chloroethyl allyl ketone.

The haloalkyl group-containing aromatic vinyl compounds preferably include those which have 7 to 12 carbon atoms, and, as specific examples thereof, there can be mentioned p-chloromethylstyrene, p-chloromethyl-α-methylstyrene and p-bis(chloromethyl)styrene.

The haloalkyl group-containing unsaturated amides preferably include those which have 4 to 12 carbon atoms, and, as specific examples thereof, there can be mentioned N-chloromethylacrylamide and N-chloromethylmethacrylamide.

The haloacyl group-containing unsaturated monomers preferably include those which have 4 to 12 carbon atoms, and, as specific examples thereof, there can be mentioned 3-(hydroxychloroacetoxy)propyl allyl ether and p-vinylbenzyl chloroacetate ester.

The epoxy group-containing monomer is not particularly limited, and preferably includes an epoxy group-containing acrylic acid ester, an epoxy group-containing methacrylic acid ester, an epoxy group-containing allyl ether and an epoxy group-containing methallyl ether. The epoxy group-containing acrylic acid ester preferably includes those which have 6 to 12 carbon atoms, and, as specific examples thereof, there can be mentioned glycidyl acrylate and acryl glycidyl ether. The epoxy group-containing methacrylic acid ester preferably includes those which have 6 to 12 carbon atoms, and, as specific examples thereof, there can be mentioned glycidyl methacrylate and methacryl glycidyl ether. The epoxy group-containing allyl ether and epoxy group-containing methallyl ether preferably include those which have 6 to 12 carbon atoms, and, as specific examples thereof, there can be mentioned allyl glycidyl ether.

The hydroxyl group-containing monomer is not particularly limited, and includes, for example, a hydroxyl group-containing acrylic acid ester, a hydroxyl group-containing methacrylic acid ester, a hydroxyl group-containing acrylamide, a hydroxyl group-containing methacrylamide and vinyl alcohol. As specific examples of the hydroxyl group-containing acrylic acid ester, there can be mentioned 2-hydroxyethyl acrylate, 2-hydroxypropyl acrylate, 3-hydroxypropyl acrylate, 2-hydroxybutyl acrylate, 3-hydroxybutyl acrylate and 4-hydroxybutyl acrylate. As specific examples of the hydroxyl group-containing methacrylic acid ester, there can be mentioned 2-hydroxyethyl methacrylate, 2-hydroxypropyl methacrylate, 3-hydroxypropyl methacrylate, 2-hydroxybutyl methacrylate, 3-hydroxybutyl methacrylate and 4-hydroxybutyl methacrylate. As a specific example of the hydroxyl group-containing acrylamide, N-methylolacrylamide can be mentioned. As a specific example of the hydroxyl group-containing methacrylamide, N-methylolmethacrylamide can be mentioned.

The diene monomer includes conjugated diene monomers and non-conjugated diene monomers. The conjugated diene monomer preferably includes those which have 4 to 16 carbon atoms, and, as specific examples thereof, there can be mentioned 1,3-butadiene, isoprene and piperylene. The non-conjugated diene monomer preferably includes those which have 4 to 16 carbon atoms, and, as specific examples thereof, there can be mentioned ethylidenenorbornene, dicyclopentadiene, dicyclopentadienyl acrylate, dicyclopentadienyl methacrylate, 2-dicyclopentadienylethyl acrylate and 2-dicyclopentadienylethyl methacrylate.

Of the above-mentioned monomers having a crosslinking site other than a carboxyl group, halogen atom-containing monomers and epoxy group-containing monomers are preferable. The monomers having a crosslinking site other than a carboxyl group may be used either alone or as a combination of at least two thereof.

The content of units of monomer having a crosslinking site other than a carboxyl group in the acrylic rubber is preferably in the range of 0 to 5% by weight and more preferably 0 to 3% by weight.

If desired, other copolymerizable monomer may be copolymerized with the (meth)acrylic acid ester monomer, the α,β-ethylenically unsaturated carboxylic acid monomer, and the optional monomer having a crosslinking site other than a carboxyl group, provided that the object of the present invention can be achieved. The copolymerizable monomer includes, for example, aromatic vinyl monomers, α,β-ethylenically unsaturated nitrile monomers, polyfunctional acrylic monomers (i.e., monomers having at least two acryloyloxy groups) and other olefin monomers. The content of units of these copolymerizable monomers in the acrylic rubber is preferably in the range of 0 to 49.9% by weight, more preferably 0 to 20% by weight.

As specific examples of the copolymerizable monomer, there can be mentioned aromatic vinyl monomers such as styrene, α-methylstyrene and divinylbenzene; α,β-ethylenically unsaturated nitrile monomers such as acrylonitrile and methactrylonitrile; polyfunctional acrylic monomers such as diethylene glycol diacrylate, diethylene glycol dimethacrylate, dipropylene glycol diacrylate and dipropylene glycol dimethacrylate; and other olefin monomers such as ethylene, propylene, vinyl acetate, ethyl vinyl ether and butyl vinyl ether. Of these, α,β-ethylenically unsaturated nitrile monomers are preferable. Acrylonitrile and methactrylonitrile are especially preferable.

The acrylic rubber used in the present invention preferably has a Mooney viscosity ($ML_{1+4}$, 100° C.) in the range of 10 to 90, more preferably 20 to 80 and especially preferably 30 to 70. When the Mooney viscosity of acrylic rubber is too small, an acrylic rubber composition tends to have poor moldability and processability and a crosslinked rubber object is liable to have poor mechanical properties. In contrast, when the Mooney viscosity is too large, an acrylic rubber composition tends to have poor moldability and processability.

The acrylic rubber used in the present invention can be produced by copolymerizing a (meth) acrylic acid ester monomer, an α,β-ethylenically unsaturated carboxylic acid monomer, an optional monomer having a crosslinking site other than a carboxyl group, and an optional other copolymerizable monomer by a conventional polymerization procedure. The polymerization procedure may be any of emulsion polymerization, suspension polymerization, bulk polymerization and solution polymerization procedures. In view of ease in control of polymerization reaction, an emulsion polymerization procedure under normal pressures is preferably adopted.

The acrylic rubber composition of the present invention comprises synthetic silica as an essential ingredient. Synthetic silica is known as white filler, i.e., white carbon, for rubber formulations. Synthetic silica includes silicic acid prepared by a wet process and silicic anhydride prepared by a dry process. The silicic acid may be any of precipitated silica or silica gel. Silicic anhydride may be any of burnt silica prepared by a burning method or heated silica prepared by a heating method. Silica made by calcining silicic acid prepared by a wet process is especially preferable. Synthetic silica may be surface-treated, for example, with a silane coupling agent to impart lipophilic property.

The synthetic silica used in the present invention preferably has an average particle diameter in the range of 7 to 70 nm, more preferably 10 to 50 nm. The synthetic silica preferably has a BET specific surface area of not larger than 200 $m^2/g$, more preferably in the range of 50 to 190 $m^2/g$. If the average particle diameter is too small or the specific surface area is too large, an acrylic rubber composition exhibits undesirably large melt viscosity at processing and tends to give a shaped article having a rough surface. In contrast, if the the specific surface area is too small, a crosslinked rubber object is liable to have low tensile strength.

The synthetic silica preferably has a pH value of not larger than 9, more preferably in the range of 5.0 to 8.5. The pH value as used in the specification is determined according to the method of measuring a pH value of pigment as stipulated in JIS K5101, wherein the pH value of an aqueous suspension of synthetic silica having a concentration of 4% by weight is measured. If the pH value is too small, a rubber vulcanizate tends to have poor heat resistance and exhibit undesirably large compression set. In contrast, if the pH value is too large, crosslinking reaction tends to occur undesirably during kneading of a rubber composition.

The amount of synthetic silica used is in the range of 5 to 200 parts by weight, preferably 5 to 150 parts by weight and more preferably 10 to 100 parts by weight, based on 100 parts by weight of acrylic rubber. If the amount of silica is too small, a crosslinked rubber object is liable to have poor mechanical properties and poor heat aging resistance. In contrast, if the amount of synthetic silica is too large, a rubber composition tends to have high melt viscosity, and poor processability and moldability.

Of the synthetic silica, those are especially preferable, which are prepared by calcining silica synthesized by a wet process. The calcined product of wet-process silica (hereinafter referred to as merely "calcined silica product") gives a crosslinked rubber object having good heat aging characteristics and/or good compression set as compared with a crosslinked rubber object made using a wet-process silica without calcination. The crosslinked rubber object made from the calcined silica product is superior in reduced compression set to those which are prepared using a dry-process silica or a calcined product of dry-process silica.

Wet-process silica is called as hydrated silicic acid, and is produced by allowing sodium silicate, mineral acid and salts to react in water. Wet-process silica generally has a primary particle diameter in the range of 15 to 100 nm, an average particle diameter in the range of 1 to 50 μm (including secondary particles), a BET specific surface area in the range of 40 to 250 $m^2/g$, a loss on heating in the range of 4 to 7% by weight, a silanol group-concentration on the surface thereof in the range of 5 to 10 groups/$nm^2$, and a pH value (as measured in aqueous suspension of 4% by weight concentration) in the range of 5.5 to 9.

The calcined silica product is prepared by heating wet-process silica usually at a temperature of 500 to 1,000° C. for 30 to 120 minutes, preferably 600 to 950° C. for 30 to 90 minutes and more preferably 700 to 900° C. for 30 to 60 minutes. When the heating temperature is too low, the beneficial effect of calcinations cannot be obtained. In contrast, when the heating temperature is too high, the silica particles are liable to be sintered to become coarse particles. When the heating time is too short, the effect of calcinations cannot be obtained. In contrast, when the heating time is too long, the beneficial effect of calcination is not enhanced with time and the calcinations is costly.

The calcined silica product preferably has not more than three silanol groups/$nm^2$, more preferably not more than 2.5 silanol groups/$nm^2$, on the surface thereof. If the concentration of silanol group on the surface is too large, a crosslinked acrylic rubber object is liable to have poor mechanical properties. The calcined silica product has a low silanol group-concentration on the surface and exhibits enhanced affinity to an acrylic rubber. Thus, in the case when the calcined silica product is incorporated, interaction between the calcined silica product and the acrylic rubber is believed to become large, and therefore the beneficial effects of the present invention are manifested markedly.

The calcined silica product preferably has an average particle diameter in the range of 1 to 10 μm and a BET specific surface area in the range of 20 to 200 $m^2/g$. When the calcined silica product has too small average particle diameter or too large BET specific surface area, an acrylic rubber composition is liable to have undesirably high viscosity and poor processability and moldability. In contrast, when the calcined silica product has too large average particle diameter or too small BET specific surface area, the calcined silica product is not uniformly dispersed in an acrylic rubber composition and a resulting crosslinked rubber object is liable to posses poor mechanical properties.

The calcined silica product preferably exhibits a loss on heating of not larger than 2% by weight. If the loss on heating is too large, a crosslinked rubber object is liable to have large compression set and poor heat aging resistance.

The calcined silica product preferably has a pH value in the range of 4.5 to 8. If the pH value is too low, the rate of crosslinking becomes low and a crosslinked rubber object has a low crosslink density and is liable to have large compression set and poor heat aging resistance. In contrast, if the pH value is too high, an acrylic rubber composition is subject to scorching at processing and molding.

The calcined silica product maybe pulverized, for example, by a hammer mill or a jet mill. Pulverized calcined silica product may be prepared either by a process wherein wet-process silica is pulverized and then heated, or by a process wherein wet-process silica is heated and then pulverized. In view of ease for the preparation of the pulverized calcined silica product, the former process wherein the wet-process silica is pulverized and then heated is preferable.

The calcined silica product may be surface-treated with a surface treating agent such as a silane coupling agent.

The calcined silica product is commercially available, for example, as Carplex CS-5, Carplex CS-7, Carplex CS-8, Carplex CS-701 and Carplex CS-801 (trademarks, supplied by Shionogi & Co., Ltd.).

Specific aluminum silicate is preferably incorporated in the acrylic rubber composition of the present invention comprising an acrylic rubber having carboxyl groups as crosslinking sites, and synthetic silica. More specifically, the acrylic rubber composition is preferably incorporated with aluminum silicate containing at least 5% by weight, preferably at least 10% by weight and more preferably at least 20% by weight, of $Al_2O_3$ wherein the total amount of $Al_2O_3$ and $SiO_2$ is at least 60% by weight, preferably at least 70% by weight and more preferably at least 80% by weight, based on the aluminum silicate.

When the content of $Al_2O_3$ in the aluminum silicate is too small, a crosslinked rubber object tends to have rather poor mechanical properties. When the total amount of $Al_2O_3$ and $SiO_2$ is too small, a crosslinked rubber object tends to have rather large compression set. The ratio of the content of $SiO_2$ to the content of $Al_2O_3$ is preferably in the range of 18/1 to 1/1 by weight.

By the incorporation of the above-mentioned aluminum silicate in combination with synthetic silica, storage stability of the acrylic rubber composition, and heat aging resistance, compression set and mechanical properties of a crosslinked rubber object can be more improved with a better balance. If aluminum silicate other than the above-mentioned aluminum silicate, or other filler is incorporated, it is difficult to improve to a sufficient extent storage stability, and heat resistance, compression set and mechanical properties with a better balance. This will be seen from comparison of Examples 1 and 2 with Examples 3 to 5, hereinafter described.

As specific examples of the above-mentioned aluminum silicate, there can be mentioned kaolin clay, calcined clay, ROSEKI(kind of corundum), sericite, mica and nephelinecinite. Of these, kaolin clay and calcined clay are preferable. These aluminum silicates may be used either alone or as a combination of at least two thereof.

The aluminum silicate usually has an average particle diameter in the range of 0.1 to 10 μm, preferably 0.3 to 5 μm, and a pH value in the range of 3 to 10, preferably 4 to 9, as measured according to JIS K5101. The particles of the aluminum silicate are of a plate shape or a leaf shape. Specific gravity thereof is in the range of 2.6 to 2.8.

The amount of the aluminum silicate is in the range of 5 to 200 parts by weight, preferably 5 to 150 parts by weight and more preferably 10 to 100 parts by weight, based on 100 parts by weight of acrylic rubber. If the amount of aluminum silicate is too small, an acrylic rubber composition tends to have poor storage stability and a crosslinked rubber object is liable to have poor heat resistance. In contrast, if the amount of aluminum silicate is too large, a crosslinked rubber object is liable to have poor mechanical properties.

The acrylic rubber composition comprises a crosslinking agent. The crosslinking agent used is not particularly limited, provided that it is suitable for a rubber having a carboxyl group as a crosslinking site. The crosslinking agent preferably includes amine compounds. Polyamine compounds are especially preferable.

Polyamine compounds having 4 to 30 carbon atoms are usually used. The polyamine compounds include, for example, aliphatic polyamine compounds and aromatic polyamine compounds. Compounds having a non-conjugated nitrogen-carbon bond such as guanidine compounds are excluded from the polyamine compounds preferably used in the present invention.

As specific examples of the aliphatic polyamine compound, there can be mentioned hexamethylenediamine, hexamethylenediamine carbamate and N,N'-dicinnamylidene-1, 6-hexanediamine.

As specific examples of the aromatic polyamine compound, there can be mentioned 4,4'-methylenedianiline, m-phenylenediamine, 4,4'-diaminodiphenyl ether, 3,4'-diaminodiphenyl ether, 4,4'-(m-phenylene-diisopropylidene) dianiline, 4,4'-(p-phenylene-diisopropylidene)dianiline, 2,2'-bis[4-(4-aminophenoxy)-phenyl]propane, 4,4'-diaminobenzanilide, 4,4'-bis(4-aminophenoxy)biphenyl, m-xylylenediamine, p-xylylenediamine and 1,3,5-benzenetriamine.

In the case when a monomer giving a crosslinking site other than a carboxyl group in the acrylic rubber, namely, a halogen atom-containing monomer, an epoxy group-containing monomer, a hydroxyl group-containing monomer, or a diene monomer is copolymerized with (meth)acrylic acid ester monomer and α,β-ethylenically unsaturated carboxylic acid monomer, crosslinking agents suitable for the respective crosslinking site-giving monomers are preferably used.

When the acrylic rubber has carboxyl groups as a crosslinking site, a triazinethiol compound or a fatty acid alkali metal salt is preferably used as the crosslinking agent. As specific examples of the triazinethiol compound, there can be mentioned triazinethiol (2,4,6-trimercapto-s-triazine) and its derivatives. The derivatives include, for example, a compound having a structure such that a part of thiol groups in a triazinethiol compound has been substituted by a secondary or tertiary amine having 1 to 8 carbon atoms, and a compound having a structure such that the hydrogen atom of a thiol group has been substituted by a chain-like or cyclic hydrocarbon group having 1 to 8 carbon atoms. Of these, triazinethiol is preferable. As specific examples of the fatty acid alkali metal salt, there can be mentioned alkali metal salts of a fatty acid having 10 to 22 carbon atoms. Of these, sodium stearate and potassium stearate are especially preferable.

When the acrylic rubber contains halogen atoms as a crosslinking site, an acid scavenger is preferably used in combination with the crosslinking agent for removing hydrogen halide released upon crosslinking. The acid scavenger includes, for example, oxides, hydroxides, carbonic acid salts, carboxylic acid salts, silicic acid salts, boric acid salts, metaboric acid salts and phosphorous acid salts of metals of group 2 of the periodic table; oxides, basic carbonic acid salts, carboxylic acid salts, basic phosphorous acid salts and basic sulfurous acid salts of metals of group 14 of the periodic table; and hydrotalcites.

As specific examples of the compounds of metals of group 2 of the periodic table, there can be mentioned magnesium oxide, calcium oxide, magnesium hydroxide, calcium hydroxide, barium hydroxide, magnesium carbonate, zinc stearate, calcium silicate, magnesium borate and barium metaborate. As specific examples of the compounds of metals of group 14 of the periodic table, there can be mentioned tin oxide, basic tin carbonate, tin carboxylate, basic tin phosphite and basic tin sulfite. The amount of acid scavenger can be appropriately chosen depending upon the amount of the halogen-containing monomer.

When the acrylic rubber has epoxy groups as a crosslinking site, cyclic organic acid ammonium salts having 7 to 22 carbon atoms can be used as a crosslinking agent. Alternatively, the polyamine compounds having 4 to 30 carbon atoms, as mentioned above as a crosslinking agent for an acrylic rubber having carboxyl groups as a crosslinking site, may be used as a crosslinking agent for the epoxy group-containing acrylic rubber. As specific examples of the cyclic organic acid ammonium salts having 7 to 22 carbon atoms, ammonium benzoate and ammonium isocyanurate can be mentioned.

When the acrylic rubber has hydroxyl groups as a crosslinking site, isocyanate compounds having 2 to 20 carbon atoms, polycarboxylic acids, and alkoxymethylmelamines are preferably used as a crosslinking agent. As specific examples of the crosslinking agents, there can be mentioned isocyanate compounds such as hexamethylene diisocyanate and tolylene diisocyanate; polycarboxylic acids such as adipic acid; and alkoxymethylmelamines such as methoxymethylmelamine.

When the acrylic rubber has copolymerized therein diene monomer units and thus has double bonds as a crosslinking site, an organic peroxide can be used as a crosslinking agent.

As specific examples of the organic peroxide, there can be mentioned di-tert-butyl peroxide, dicumyl peroxide, 1,1-di(tert-butylperoxy)-3,3,5-trimethylcyclohexane, 2,5-diemthyl-2,5-di(tert-butylperoxy)hexyne-3,1,3-di(tert-butylperoxydiisopropyl)benzene, 2,5-dimethyl-2,5-di(benzoylperoxy)hexane, tert-butylperoxy benzoate and tert-butylperoxydiisopropyl carbonate.

The amount of crosslinking agent is in the range of 0.05 to 20 parts by weight, preferably 0.1 to 10 parts by weight, more preferably 0.2 to 7 parts by weight and especially preferably 0.3 to 5 parts by weight, based on 100 parts by weight of the acrylic rubber. When the amount of crosslinking agent is too small, the crosslinking is insufficient and a crosslinked rubber object tends to be difficult to keep its shape. In contrast, when the amount of crosslinking agent is too large, a crosslinked rubber object is liable to be hard and have poor rubber elasticity.

According to the need, the acrylic rubber composition of the present invention may have incorporated therein additives such as a silane coupling agent, an crosslinking acccelerator, an antioxidant, a light stabilizer, a plasticizer, a lubricant, a self-adhesive, a fire retarding agent, a mildewproofing agent, an antistatic agent, a colorant and a reinforcing filler.

Especially a silane coupling agent is preferably incorporated because it has a function of converting hydrophilic silanol groups present on the surface of synthetic silica to hydrophobic groups, and thus enhancing the affinity of the acrylic rubber with synthetic silica.

The silane coupling agent used is not particularly limited, and includes, for example, an amino group-containing silane coupling agent, an epoxy group-containing silane coupling agent, an acryloxy group-containing silane coupling agent, a methacryloxy group-containing silane coupling agent, a mercapto group-containing silane coupling agent, and a vinyl group-containing silane coupling agent.

As specific examples of the silane coupling agent, there can be mentioned amino group-containing silane coupling agents such as N-(β-aminoethyl)-γ-aminopropyltrimethoxysilane, γ-aminopropyltrimethoxysilane and γ-aminopropyltriethoxy-silane; epoxy group-containing silane coupling agents such as γ-glycidoxypropyltrimethoxysilane, γ-glycidoxypropylmethyl-dimethoxysilane, β-(3,4-epoxycyclohexyl)ethyltrimethoxysilane and γ-mercaptopropyltrimethoxysilane; acryloxy group-containing silane coupling agents and methacryloxy group-containing silane coupling agents such as γ-methacryloxypropyl-trimethoxysilane and γ-methacryloxypropyl-tris(β-methoxy-ethoxy) silane; mercapto group-containing silane coupling agents such as γ-mercaptopropyltrimethoxysilane, γ-mercaptomethyl-trimethoxysilane, γ-mercaptomethyltriethoxysilane and γ-mercaptohexamethyldisilazane; and vinyl group-containing silane coupling agents such as vinyl-trimethoxysilane, vinyltriethoxysilane, vinyltris(β-methoxy-ethoxy)silane, vinyltrichlorosilane and vinyltriacetoxysilane.

Of the above-mentioned silane coupling agents, an amino group-containing silane coupling agent and an epoxy group-containing silane coupling agent are preferable. The silane coupling agents may be used either alone or as a combination of at least two thereof.

The amount of silane coupling agent used is usually in the range of 0.1 to 10 parts by weight, preferably 0.1 to 8 parts by weight, based on 100 parts by weight of the acrylic rubber. When the amount of silane coupling agent is too large, a crosslinked rubber object is liable to have poor dry physical properties and exhibit lowered rubber elasticity.

The crosslinking accelerator used is not particularly limited, but, in the case when a polyamine compound is used as the crosslinking agent, a crosslinking accelerator having a base dissociation constant in the range of $10^{-12}$ to $10^6$ as measured in water at a temperature of 25° C. is especially preferably used. Such crosslinking accelerator includes, for example, guanidine compounds, imidazole compounds, quaternary onium salts, polyvalent tertiary amine compounds, tertiary phosphine compounds and alkali metal salts of a weak acid.

As specific examples of the crosslinking accelerator, there can be mentioned guanidine compounds such as 1,3-diphenylguanidine and 1,3-di-o-tolylguanidine; imidazole compounds such as 2-methylimidazole and 2-phenylimidazole; quaternary onium salts such as tetra-n-butylammonium bromide, octadecyl-tri-n-butylammonium bromide; polyvalent tertiary amine compounds such as triethylenediamine and 1,8-diazabicyclo[5.4.0]undene-7; tertiary phosphine compounds such as triphenylphosphine and tri-p-tolylphosphine; and alkali metal salts of a weak acid which include inorganic weak acid salts such as a sodium or potassium salt of phosphoric acid or carbonic acid, and organic weak acid salts such as sodium or potassium salt of stearic acid or lauric acid.

When the acrylic rubber has units of a monomer having crosslinking sites other than a carboxyl group, namely, units of a monomer containing a halogen atom, an epoxy group or a hydroxyl group, or a diene monomer, which monomers have been copolymerized in combination with an α,β-ethylenically unsaturated carboxylic acid monomer, an appropriate crosslinking accelerator is preferably used in combination with a crosslinking agent.

In the case when the acrylic rubber has a halogen atom as crosslinking sites in addition to a carboxyl group, and when a triazinethiol compound is used as a crosslinking agent, it is preferable to use as a crosslinking accelerator a dithiocarbamic acid compound having 2 to 12 carbon atoms or a thiuram sulfide having 2 to 30 carbon atoms.

As specific examples of the dithiocarbamic acid compound, there can be mentioned zinc dimethyldithiocarbamate, copper dimethyldithiocarbamate, cadmium dimethyldithiocarbamate, lead dimethyldithiocarbamate, bismuth dimethyldithiocarbamate, iron dimethyldithiocarbamate, tellurium dimethyldithiocarbamate, zinc diethyldithiocarbamate, zinc di-n-butyldithiocarbamate, zinc di-n-hexyldithiocarbamate, zinc di-n-octyldithiocarbamate, zinc di-n-decyldithiocarbamate, zinc di-n-dodecyldithio-carbamate, zinc methylbenzyldithiocarbamate, zinc dibenzyldithiocarbamate, zinc methylcyclohexyldithiocarbamate and zinc dicyclohexyldithiocarbamate.

As specific examples of the thiuram sulfide, there can be mentioned tetramethylthiuram monosulfide, tetramethylthiuram disulfide, tetraethylthiuram disulfide, tetrabutylthiuram disulfide and dipentamethylenethiuram tetrasulfide.

In the case when the acrylic rubber has a halogen atom as crosslinking sites in addition to a carboxyl group, and when an alkali metal salt of fatty acid is used as a crosslinking agent, it is preferable to use sulfur or a triazinethiol compound.

In the case when the acrylic rubber has a halogen atom as crosslinking sites in addition to a carboxyl group, and when the above-mentioned polyamine compound is used as the crosslinking agent, a crosslinking accelerator having a base dissociation constant in the range of $10^{-12}$ to $10^6$ as measured in water at a temperature of 25° C. is especially preferably used. This is similar to the case when the acrylic rubber has only a carboxyl group as crosslinking sites, and when the above-mentioned polyamine compound is used as the crosslinking agent.

In the case when the acrylic rubber has hydroxyl groups as crosslinking sites in addition to carboxyl groups, and when an isocyanate compound is used as a crosslinking agent, it is preferable to use as a crosslinking accelerator the above-mentioned guanidine compounds, quaternary onium salts, tertiary amine compounds and tertiary phosphine compounds.

The quaternary onium salts are compounds represented by the general formula:

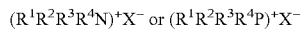

$(R^1R^2R^3R^4N)^+X^-$ or $(R^1R^2R^3R^4P)^+X^-$ wherein $R^1$, $R^2$, $R^3$ and $R^4$ represent an alkyl, alkoxy, aryl, alkylaryl, aralkyl or polyoxyalkylene group having 1 to 25 carbon atoms, or three or less of $R^1$, $R^2$, $R^3$ and $R^4$ are heterocyclic ring; and $X^-$ represents $Cl^-$, $Br^-$, $I^-$, $HSO_4^-$, $H_2PO_4^-$, $RCOO^-$, $ROSO_2^-$ or $CO_3^-$ where R is an alkyl, alkoxy, aryl, alkylaryl or aralkyl group having 1 to 18 carbon atoms.

As specific examples of the quaternary onium salts, there can be mentioned quaternary ammonium salts such as tetrabutylammonium bromide, tetrabutylammonium chloride, tetrabutylammonium iodide, tetraethylammonium bromide, n-dodecyltrimethylammonium bromide, octadecyltrimethylammonium bromide, trimethylbenzylammonium bromide, cetyldimethylbenzylammonoium bromide, cetylpyridium bromide, cetylpyridium sulfate, tetraethylammonium acetate, trimethylbenzylammonium benzoate and 5-benzyl-1,5-diazabicyclo[4.3.0]-5-nonenium chloride; and quaternary phosphonium salts such as tetraphenylphosphonium chloride, benzyltriphenylphosphonium chloride, benzyltriphenyl-phosphonium bromide, triphenylmethoxymethylphosphonium chloride, triphenylmethylcarbonylmethylphosphonium chloride and trioctylbenzylphosphonium chloride.

As specific examples of the tertiary amine compounds, there can be mentioned triethylamine, diethylcyclohexylamine, diethyllaurylamine, tetramethylethylenediamine, tetramethylhexamethylenediamine, N,N-dimethylbenzylamine, triphenylamine, triethylenediamine, hexamethylenetetramine, pentamethyldiethylenetriamine, 1,8-diazabicyclo[5.4.0]-undecene-7, N,N-diethylaniline, pyridine, pyrrole and dimethylpiperazine.

As specific examples of the tertiary phosphine compounds, there can be mentioned triphenylphosphine and tri(methylphenyl)phosphine.

In the case when the acrylic rubber has double bonds as crosslinking sites in addition to carboxyl groups, and when an organic peroxide is used as a crosslinking agent, it is preferable to use a bismaleimide compound as a crosslinking accelerator.

As specific examples of the bismaleimide compounds, there can be mentioned N,N'-m-phenylenebismaleimide, N,N'-p-phenylenebismaleimide, N,N'-p-phenylene(1-methyl)bismaleimide, N,N'-2,7-naphthenebismaleimide, N,N'-m-naphthenebismaleimide, N,N'-m-phenylene-4-methylbismaleimide and N,N'-m-phenylene-(4-ethyl) bismaleimide. Of these, N,N'-m-phenylenebismaleimide is preferable.

The amount of the crosslinking accelerator is usually in the range of 0.1 to 20% by weight, preferably 0.2 to 15% by weight and more preferably 0.3 to 10 parts by weight, based on 100 parts by weight of the acrylic rubber. If the amount of crosslinking accelerator is too large, the rate of crosslinking becomes too high at crosslinking, blooming of the crossslinking accelerator to the surface of crosslinked rubber object tends to occur, and a crosslinked rubber object is liable to be too hard. In contrast, if the amount of crosslinking accelerator is too small, a crosslinked rubber object is liable to have very low tensile strength, and to exhibit large elongation change and large tensile strength change after heat load is imposed.

If desired, a rubber other than the acrylic rubber, an elastomer and a resin may be incorporated in the acrylic rubber composition of the present invention. As specific examples of such ingredients, there can be mentioned rubbers such as natural rubber, acrylic rubbers other than the above-mentioned acrylic rubber, polybutadiene rubber, polyisoprene rubber, styrene-butadiene rubber and acrylonitrile-butadiene rubber; elastomers such as olefin elastomer, styrene elastomer, vinyl chloride elastomer, polyester elastomer, polyamide elastomer, polyurethane elastomer and polysiloxane elastomer; and resins such as polyolefin resin, polystyrene resin, polyacrylic resin, polyphenylene-ether resin, polyester resin, polycarbonate resin and polyamide resin.

The acrylic rubber composition of the present invention can be prepared by adopting an appropriate mixing procedure such as roll mixing, Banbury mixing, screw mixing and solution mixing. The order of mixing the ingredients are not particularly limited, but, preferably, ingredients which are not subject to reaction or decomposition or degradation when heated are first mixed thoroughly, and then, ingredients which are subject to reaction or decomposition or degradation when heated, such as a crosslinking agent and a crosslinking accelerator, are added and mixed together for a short time at a temperature at which reaction or decomposition or degradation does not occur.

The acrylic rubber composition of the present invention is shaped by an appropriate shaping procedure such as extrusion shaping, or molding including injection molding, transfer molding and compression molding.

The extrusion shaping can be carried out by a conventional procedure generally adopted for shaping rubber material. More specifically an acrylic rubber composition prepared, for example, by roll mixing is fed through a hopper of an extruder into a screw where the rubber composition is softened by heat transferring from a barrel. The softened rubber composition is conveyed to a head of the extruder, and extruded through a die of predetermined shape provided in the extruder head to form an extruded article of continuous length having a desired section such as a plate, a rod, a pipe, a hose or other articles of shaped section. The barrel temperature is usually in the range of 50 to 120° C., preferably 60 to 100° C. The head temperature is usually in the range of 60 to 130° C., preferably 60 to 110° C. The die temperature is usually in the range of 70 to 130° C., preferably 80 to 100° C.

The molding is carried out by injecting the acrylic rubber composition into a single cavity or plural cavities of a mold, where the rubber composition is crosslinked (primary crosslinking) by heating the mold to a temperature in the range of 130 to 220° C., preferably 140 to 200° C. According to the need, the thus-crosslinked rubber molding is further crosslinked (secondary crosslinking) by maintaining the molding at the above-mentioned temperature for 1 to 48 hours by an oven, hot air or steam.

EXAMPLES

The invention will now be specifically described by the following examples and comparative examples, that by no means limit the scope of the invention. Parts and % in these examples are by weight unless otherwise specified.

Properties of silica, rubber composition and crosslinked object were determined by the following methods.

(1) Average Particle Diameter of Silica

An accumulated particle diameter distribution curve (with ordinate representing particle diameter) is obtained by using a Coulter counter, and a particle diameter at an accumulation of 50% is the average particle diameter (unit: μm).

(2) Concentration of Silanol Group on Silica Surface

Moisture absorption of silica is determined at a temperature of 25° C. by volumetric absorption measurement using a full-automatic moisture adsorption measuring apparatus "BELSORP 18" available from Japan BEL, Inc. The measurement is made on five points. Moisture adsorption in monomolecular layer ($V_m$) is calculated by the method of least squares according to the following BET equation:

BET equation: $X/[V(1-X)]=1/V_mC+[X(C-1)]/V_mC$ where X: adsorption relative pressure
  $X=P/P_0$ where P: water vapor pressure at adsorption equilibrium
  $P_0$: saturated water vapor pressure at 26° C.
V: volume ($cm^3$) of moisture adsorbed per unit weight g under standard condition
$V_m$: volume of moisture corresponding to monolayer coverage
C: constant Nitrogen adsorption of silica is determined at a liquid nitrogen temperature using a full-automatic nitrogen adsorption measuring apparatus "BELSORP 28" available from Japan BEL, Inc. BET specific surface area ($S_{N2}$) is calculated from the nitrogen adsorption. The concentration of silanol group on the surface of silica is calculated from $S_{N2}$ and the above-mentioned $V_m$ according to the following equation.

Concentration of silanol group on surface=$26.9 \times V_m/S_{N2}$ (3) Storage Stability The crosslinking characteristic (i.e., the minimum torque) of an uncrosslinked acrylic rubber composition immediately after kneading is measured at a temperature of 180° C. using a rotorless rheometer vulcanization tester (Moving die rheometer "MDR 2000P", available from Alpha Technologies Co., Ltd.) according to ASTM D5289. The crosslinking characteristic (i.e., the minimum torque) of an uncrosslinked acrylic rubber composition after left to stand for a period of 7 days at a temperature of 40° C. and a relative humidity of 180% is measured at a temperature of 180° C. using the same rotorless rheometer. The storage stability of the acrylic rubber composition is expressed by the difference between the minimum torque as measured immediately after kneading and the minimum torque as measured after left to stand for 7 days. The smaller the minimum torque difference, the better the storage stability.

(4) Mechanical Properties and Heat Aging Resistance

An acrylic rubber composition is pressed at a temperature of 170° C. for 20 minutes to be thereby crosslinked and shaped into a square sheet having a size of 15 cm×15 cm×2 mm (thickness). Then the sheet is further cured (secondary crosslinking) at a temperature of 170° C. for 4 hours in an oven. The sheet is punched to a testing specimen of a predetermined shape.

Tensile strength and elongation at break (hereinafter referred to as "elongation") are measured according to JIS K6251. Hardness is measured according to JIS K6253. Heat aging resistance is evaluated by measuring tensile strength, elongation and hardness after the specimen is left to stand in hot air atmosphere at a temperature of 175° C. for a period of 336 hours, and comparing the tensile strength, elongation and hardness as measured after standing in hot-air with the tensile strength, elongation and hardness as measured before standing in hot-air. The heat aging resistance is expressed by the changes (%) of tensile strength and elongation, and the change (points) of hardness. The smaller the these changes, the better the heat aging resistance.

(5) Compression Set

An acrylic rubber composition is pressed to be thereby crosslinked and shaped into a cylindrical specimen having a diameter of 29 mm and a height of 12.5 mm. The specimen is cured (secondary crosslinking) at a temperature of 170° C. for 4 hours. The compression set is determined according to JIS K6262 as follows. The cured specimen is compressed by 25% and the compressed specimen is left as it is to stand at a temperature of 175° C. for 70 hours. Then the pressure is released and the compression set is measured.

Production Example 1 (Acrylic Rubber "a")

A polymerization reactor equipped with a thermometer and a stirrer was charged with 200 parts of water, 3 parts of sodium laurylsufate, 50 parts of ethyl acrylate, 34 parts of n-butyl acrylate, 14 parts of 2-methoxyethyl acrylate and 2 parts of monobutyl fumarate. Deaeration under reduced pressure and flushing with nitrogen gas were repeated to thoroughly remove oxygen. Then 0.005 part of cumene hydroperoxide and 0.002 part of sodium formaldehydesulfoxylate were added, and an emulsion polymerization was commenced at a temperature of 20° C. under normal pressure. The polymerization was continued until the polymerization conversion reached 95%. The emulsion polymerization liquid was coagulated with an aqueous calcium chloride solution, and the coagulated solid was washed with water and dried to give acrylic rubber "a".

Acrylic rubber "a" was comprised of 50% of ethyl acrylate monomer units, 34% of n-butyl acrylate monomer units, 14% of 2-methoxyethyl acryalte monomer units and 2% of monobutyl fumarate monomer units, and had a Mooney viscosity ($ML_{1+4}$, 100° C.) of 35.

Production Example 2 (Acrylic Rubber "b")

Acrylic rubber "b" was produced by the same procedures as adopted in Production Example 1 for the production of acrylic rubber "a" except that the amount of ethyl acrylate charged in the reactor was changed from 50 parts to 48 parts, and 4 parts of mono-n-butyl fumarate was used instead of 2 parts of mono-n-butyl fumarate. All other conditions remained the same.

Acrylic rubber "b" was comprised of 48% of ethyl acrylate monomer units, 34% of n-butyl acrylate monomer units, 14% of 2-methoxyethyl acryalte monomer units and 4% of monobutyl fumarate monomer units, and had a Mooney viscosity ($ML_{1+4}$, 100° C.) of 35.

Comparative Production Example 1 (Acrylic Rubber "c")

Acrylic rubber "c" was produced by the same procedures as adopted in Production Example 1 for the production of acrylic rubber "a" except that the amount of n-butyl acrylate charged in the reactor was changed from 34 parts to 28 parts, the amount of 2-methoxyethyl acrylate was changed from 14 parts to 20 parts, and 2 parts of vinyl chloroacetae was used instead of 2 parts of mono-n-butyl fumarate. All other conditions remained the same.

Acrylic rubber "c" was comprised of 50% of ethyl acrylate monomer units, 28.5% of n-butyl acrylate monomer units, 20% of 2-methoxyethyl acrylate monomer units and 1.5% of vinyl chloroacetate monomer units, and had a Mooney viscosity ($ML_{1+4}$, 100° C.) of 50.

Example 1

The following ingredients were placed in Banbury mixer, and were kneaded together at 50° C.

| | |
|---|---|
| Acrylic rubber "a" | 100 parts |
| Synthetic silica 1 ("Nipsil ER" available from Japan Silica Co., Ltd., wet-process silica, average particle diameter: 32 nm, BET specific surface area: 90 m²/g, pH: 7.8) | 30 parts |
| Aluminum silicate [component (C)] | 40 parts |
| Stearic acid (softening agent) | 3 parts |
| γ-Glycidoxypropyltrimethoxysilane | 1 part |
| Octadecylamine (processing aid) | 0.5 part |
| 4,4'-bis(α,α-dimethylbenzyl)diphenylamine ("Nocrac CD", available from Ouchishinko Chem. Ind. Co., Ltd., antioxidant) | 2 parts |
| Thereafter, the following ingredients were added and the mixture was kneaded together at 40° C. by an open roll to give an acrylic rubber composition. | |
| Hexamethylenediamine carbamate (crosslinking agent) | 0.6 part |
| 1,3-Di-o-tolylguanidine (crosslinking accelerator) | 2 parts |

Storage stability, mechanical properties (tensile strength, elongation and hardness), heat aging resistance (elongation change and hardness change), and compression set of the acrylic rubber composition were evaluated. The results are shown in Table 1.

Examples 2 to 5

Acrylic rubber compositions were prepared by the same procedures as described in Example 1 except that synthetic silica, and aluminum silicate or its substitute shown in Table 1 were used in amounts shown in Table 1. All other conditions remained the same.

Storage stability, mechanical properties (tensile strength, elongation and hardness), heat aging resistance (elongation change and hardness change), and compression set of the acrylic rubber compositions were evaluated. The results are shown in Table 1.

Comparative Example 1

An acrylic rubber composition was prepared by the same procedures as described in Example 1 except that acrylic rubber "b" was used instead of acrylic rubber "a", 0.5 part of 2,4,6-trimercapto-s-triazine was used as crosslinking agent instead of 0.6 part of hexamethylenediamine carbamate, and 1.5 parts of zinc dibutyldithiocarbamate was used as crosslinking accelerator instead of 2 parts of 1,3-di-o-tolylguanidine. All other conditions remained the same.

Storage stability, mechanical properties (tensile strength, elongation and hardness), heat aging resistance (elongation change and hardness change), and compression set of the acrylic rubber composition were evaluated. The results are shown in Table 1.

TABLE 1

| | Examples | | | | | Comp. Ex. |
|---|---|---|---|---|---|---|
| | 1 | 2 | 3 | 4 | 5 | 1 |
| Composition (parts) | | | | | | |
| A: Acrylic rubber a | 100 | 100 | 100 | 100 | 100 | — |
| A: Acrylic rubber b | — | — | — | — | — | 100 |
| B: Synthetic silica *1 | 30 | — | 30 | 30 | 30 | 30 |
| B: Synthetic silica *2 | — | 30 | — | — | — | — |
| Aluminum silicate 1 *3 | 40 | — | — | — | — | 40 |
| Aluminum silicate 2 *4 | — | 40 | — | — | — | — |
| Calcium carbonate *5 | — | — | 50 | — | — | — |
| Calcium metasilicate *6 | — | — | — | 50 | — | — |
| Graphite *7 | — | — | — | — | 50 | — |
| C: Hexamethylene dicarbamate | 0.6 | 0.6 | 0.6 | 0.6 | 0.6 | — |
| C: 2,4,6-Trimercapto-s-triazine | — | — | — | — | — | 0.5 |
| Evaluation results Storage stability | | | | | | |
| Change of minum torque(dN · m) | 0 | 0 | 0 | 0 | 0 | 12 |
| Mechanical properties | | | | | | |
| Tensile strength (MPa) | 9.1 | 10.8 | 9.4 | 5.8 | 5.9 | 15.2 |
| Elongation (%) | 315 | 200 | 385 | 300 | 280 | 235 |
| Hardness (JIS) | 56 | 59 | 51 | 55 | 62 | 64 |
| Heat aging resistance | | | | | | |
| Elongation change (%) | −41 | −28 | −51 | −27 | −36 | 0 |
| Hardness change (point) | 2 | 5 | 15 | 1 | 1 | 6 |
| Compression set (%) | 29 | 21 | 35 | 30 | 30 | 34 |

Note:
*1 "Nipsil ER", available from Japan Silica Co., Ltd., wet process-silica, average particle diameter: 32 nm, BET specific surface area: 90 m²/g, pH 7.8
*2 "Ultrasil 7006 GR", available from Japan Degussa Co., Ltd., wet-process silica, average particle diameter: 800 nm, BET specific surface area: 127 m²/g, pH 6.5
*3 $SiO_2$ content: 49.1%, $Al_2O_3$ content: 44.3%, total content of $SiO_2$ and $Al_2O_3$: 82.9%, average particle diameter 800 nm
*4 $SiO_2$ content: 45%, $Al_2O_3$ content: 38%, total content of $SiO_2$ and $Al_2O_3$: 83%, average particle diameter: 0.3 μm, pH: 4.5, BET specific surface area: 24 m²/g, surface-treated with 1% by weight, based on the weight of the aluminum silicate, of N-(β-aminoethyl)-γ-aminopropyltrimethoxysilane
*5 $SiO_2$ content: 0.1%, $Al_2O_3$ content: 0.3%, total content of $SiO_2$ and $Al_2O_3$: 0.4%, average particle diameter: 0.04 μm, pH: 8.8
*6 $SiO_2$ content: 50.9%, $Al_2O_3$ content: 0.3%, total content of $SiO_2$ and $Al_2O_3$: 51.2%, pH: 9.5
*7 $SiO_2$ content: 0.3%, $Al_2O_3$ content: 0.1%, total content of $SiO_2$ and $Al_2O_3$: 0.4%, average particle diameter: 23 μm As seen from Table 1, the acrylic rubber composition of the present invention exhibits good storage stability and gives a crosslinked rubber object having good mechanical properties, good heat aging resistance and low compression set (Example 1 to 5). Especially, an acrylic rubber composition having incorporated therein aluminum silicate containing at least 5% by weight of $Al_2O_3$ wherein the total amount of $Al_2O_3$ and $SiO_2$ is at least 60% by weight based on the aluminum silicate exhibits excellent storage stability, and gives a crosslinked rubber object having good heat aging resistance, and good mechanical properties and greatly reduced compression set (Examples 1 and 2). Note, fillers used in Examples 3 to 5 are those which are other than aluminum silicate, or aluminum silicate which is other than that wherein the total amount of $Al_2O_3$ and $SiO_2$ is smaller than 60% by weight.

An acrylic rubber composition comprising acrylic rubber "c" containing chlorine instead of carboxyl groups as crosslinking site exhibits very poor storage stability (Comparative Example 1).

Example 6

The following ingredients were placed in Banbury mixer, and were kneaded together at 50° C.

| | |
|---|---|
| Acrylic rubber "a" | 100 parts |
| Calcined silica product 1 ("Carplex CS-5" available from Shionogi & Co., Ltd., silica product prepared by calcining wet-process silica at 800° C. for 40 minutes, concentration of silanol group on the surface: about $2/nm^2$, average particle diameter: 2.3 μm, BET specific surface area: 154 $m^2/g$, loss on heat: 1.1%, pH: 5.7) | 50 parts |
| Stearic acid (softening agent) | 2 parts |
| γ-Glycidoxypropyltrimethoxysilane | 1 part |
| Octadecylamine (processing aid) | 0.5 part |
| 4,4'-bis(α,α-dimethylbenzyl)diphenylamine ("Nocrac CD", available from Ouchishinko Chem. Ind. Co., Ltd., antioxidant) | 2 parts |
| Thereafter, the following ingredients were added and the mixture was kneaded together at 40° C. by an open roll to give an acrylic rubber composition. | |
| Hexamethylenediamine carbamate (crosslinking agent) | 0.6 part |
| 1,3-Di-o-tolylguanidine (crosslinking accelerator) | 2 parts |

Heat aging resistance (tensile strength change, elongation change and hardness change), and compression set of the acrylic rubber composition were evaluated. The results are shown in Table 2.

Examples 7 and 8

Acrylic rubber compositions were prepared by the same procedures as described in Example 6 except that the ingredients shown in Table 2 were used in amounts shown in Table 1 with all other conditions remaining the same.

Heat aging resistance (tensile strength change, elongation change and hardness change), and compression set of the acrylic rubber composition were evaluated. The results are shown in Table 2.

TABLE 2

| | Examples | | |
|---|---|---|---|
| | 6 | 7 | 8 |
| Composition (parts) | | | |
| A: Acrylic rubber a | 100 | — | 100 |
| A: Acrylic rubber b | — | 100 | — |
| B: Calcined silica 1 *1 | 50 | — | — |
| B: Calcined silica 2 *2 | — | 50 | — |
| B: Dry-process silica *3 | — | — | 50 |
| C: Hexamethylene dicarbamate | 0.6 | 0.6 | 0.6 |
| C: 2,4,6-Trimercapto-s-triazine | — | — | — |
| Evaluation results | | | |
| Heat aging resistance | | | |
| Tensile strength (%) | −39 | −39 | −16 |
| Elongation change (%) | −45 | −48 | −56 |
| Hardness change (point) | 9 | 9 | 17 |
| Compression set (%) | 21 | 18 | 39 |

Note,
*1 "Carplex CS-5" available from Shionogi & Co., Ltd., silica product prepared by calcining wet-process silica at 800° C. for 40 minutes, concentration of silanol group on the surface: about $2/nm^2$, average particle diameter: 2.3 μm, BET specific surface area: 154 $m^2/g$, loss on heat: 1.1%, pH: 5.7
*2 "Carplex CS-7" available from Shionogi & Co., Ltd., silica product prepared by calcining wet-process silica at 850° C. for 50 minutes, concentration of silanol group on the surface: about $2/nm^2$, average particle diameter: 3 μm, BET specific surface area: 133 $m^2/g$, loss on heat: 0.9%, pH: 6.9
*3 "Aerosil R972" available from Japan Aerosil Co., Ltd., dry-process silica, concentration of silanol group on the surface: about $3.5/nm^2$, average particle diameter: 1.6 μm, BET specific surface area: 120 $m^2/g$, loss on heat: 0.4%, pH: 3.8

As seen from Table 2, the acrylic rubber composition of the present invention gives a crosslinked rubber object having good heat aging resistance, reduced compression set and good mechanical properties (Examples 6 to 8). Especially an acrylic rubber composition containing a calcined silica product as synthetic silica gives a crosslinked rubber silicate having greatly reduced compression set and more enhanced heat aging resistance (Examples 6 and 7).

INDUSTRIAL APPLICABILITY

The acrylic rubber composition of the present invention has good storage stability, and gives a crosslinked rubber object having high heat aging resistance, reduced compression set, and high tensile strength and other good mechanical properties.

In view of the above-mentioned benefits, the acrylic rubber composition of the present invention is used in the fields of, for example, automobile and other transport, general instruments and apparatus, and electrical instruments. More specifically the acrylic rubber composition is useful for, for example, sealing materials such as O-ring, gasket, oil seal and bearing seal; cushioning materials and vibration insulators; wire coating material; industrial belts; tubes and hoses; and sheets.

The invention claimed is:

1. An acrylic rubber composition comprising:
   (A) 100 parts by weight of an acrylic rubber consisting of
       80 to 99.9% by weight of units of at least one monomer selected from the group consisting of acrylic acid ester monomers and methacrylic acid ester monomers, and
       0.1 to 20% by weight of units of a monoester of an α,β-ethylenically unsaturated dicarboxylic acid monomer having 3 to 11 carbon atoms with an alkanol having 1 to 8 carbon atoms,
   (B) 5 to 200 parts by weight of synthetic silica having a BET specific surface area of not larger than 200 $m^2/g$,
   (C) 0.05 to 20 parts by weight of a polyamine compound, and
   (D) 5 to 200 parts by weight of aluminum silicate containing at least 5% by weight of $Al_2O_3$ wherein the total amount of $Al_2O_3$ and $SiO_2$ is at least 60% by weight based on the aluminum silicate.

2. The acrylic rubber composition according to claim 1, wherein
   the units of acrylic acid ester monomers comprise
       30 to 100% by weight of units of at least one ester monomer of acrylic acid with an alkanol having 1 to 8 carbon atoms and
       0 to 70% by weight of units of at least one ester monomer of acrylic acid with an alkoxyalkyl alcohol having 2 to 8 carbon atoms; and
   the units of methacrylic acid ester monomers comprise
       30 to 100% by weight of units of at least one ester monomer of methacrylic acid with an alkanol having 1 to 8 carbon atoms and 0 to 70% by weight of units of at least one ester monomer of methacrylic acid with an alkoxyalkyl alcohol having 2 to 8 carbon atoms.

3. The acrylic rubber composition according to claim 1, wherein the synthetic silica has an average particle diameter in the range of 7 to 70 nm.

4. The acrylic rubber composition according to claim 1, wherein the synthetic silica has a pH value of not larger than 9.

5. The acrylic rubber composition according to claim 1, wherein the synthetic silica is a calcined silica product prepared by heating wet process silica.

6. The acrylic rubber composition according to claim 5, wherein the calcined silica product is prepared by heating process silica at a temperature in the range of 500 to 1,000° C. for 30 to 120 minutes.

7. The acrylic rubber composition according to claim 5, wherein the calcined silica product has not more than three silanol groups/nm$^2$ on the surface thereof.

8. The acrylic rubber composition according to claim 5, wherein the calcined silica has an average particle diameter in the range of 1 to 10 μm and a BET specific surface area in the range of 20 to 200 m$^2$/g.

9. The acrylic rubber composition according to claim 5, wherein the calcined silica product exhibits a loss on heating of not larger than 2% by weight.

10. The acrylic rubber composition according to claim 5, wherein the calcined silica product has a pH value of not more than 9.

11. The acrylic rubber composition according to claim 1, wherein the ratio of the content of $SiO_2$ to the content of $Al_2O_3$ is in the range of 18/1 to 1/1 by weight.

12. The acrylic rubber composition according to claim 1, which further comprises 0.1 to 20 parts by weight, based on 100 parts by weight of the acrylic rubber, of a crosslinking accelerator having a base dissociation constant in the range of $10^{-12}$ to $10^6$ as measured in water at a temperature of 25° C.

13. The acrylic rubber composition according to claim 1, which further comprises 0.1 to 10 parts by weight, based on 100 parts by weight of the acrylic rubber, of a silane coupling agent.

14. A crosslinked object made by crosslinking the acrylic rubber composition as claimed in claim 1.

* * * * *